United States Patent
de Andrade et al.

(10) Patent No.: US 9,788,058 B2
(45) Date of Patent: Oct. 10, 2017

(54) METHOD AND SYSTEM FOR AUTOMATIC INSERTION OF INTERACTIVE TV TRIGGERS INTO A BROADCAST DATA STREAM

(75) Inventors: David de Andrade, San Anselmo, CA (US); Ranjit Sahota, Fairfax, CA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 1720 days.

(21) Appl. No.: 09/841,644

(22) Filed: Apr. 23, 2001

(65) Prior Publication Data

US 2002/0059644 A1    May 16, 2002

Related U.S. Application Data

(60) Provisional application No. 60/199,686, filed on Apr. 24, 2000.

(51) Int. Cl.
  *H04N 7/10* (2006.01)
  *H04N 7/025* (2006.01)
  (Continued)

(52) U.S. Cl.
  CPC ... *H04N 21/44222* (2013.01); *G06F 17/3089* (2013.01); *G06F 17/30905* (2013.01); *H04N 7/088* (2013.01); *H04N 7/16* (2013.01); *H04N 21/25883* (2013.01); *H04N 21/2668* (2013.01); *H04N 21/4622* (2013.01); *H04N 21/4782* (2013.01); *H04N 21/812* (2013.01); *H04N 21/8586* (2013.01); *H04N 21/434* (2013.01); *H04N 21/4532* (2013.01)

(58) Field of Classification Search
  CPC ........... H04N 21/222; H04N 21/23418; H04N 21/23424; H04N 21/43
  USPC ........ 725/109–114, 136–142, 18–19, 32–36; 709/217–219
  See application file for complete search history.

(56) References Cited

U.S. PATENT DOCUMENTS

| | | |
|---|---|---|
| 4,647,974 A | 3/1987 | Butler et al. |
| 5,469,206 A | 11/1995 | Strubbe et al. |

(Continued)

FOREIGN PATENT DOCUMENTS

| | | |
|---|---|---|
| DE | 60217091 T2 | 6/2007 |
| EP | 0915621 B1 | 5/1999 |

(Continued)

OTHER PUBLICATIONS

Steinhorn, Jason and Mark Kohler. "Enhancing TV With ATVEF" Embedded Systems Programming, Oct. 1999, pp. 55-64.*

(Continued)

*Primary Examiner* — Dominic D Saltarelli
(74) *Attorney, Agent, or Firm* — Banner & Witcoff, Ltd.

(57) ABSTRACT

A method and system are disclosed for automatic insertion of interactive television (TV) triggers into a broadcast data stream. The automatic insertion of the Interactive TV trigger can be based on recognition of one or more elements within the broadcast data stream. In particular, a recognized element can trigger the insertion of the interactive TV trigger into the broadcast data stream. Furthermore, the interactive TV trigger can be pre-inserted into the stored broadcast content having the recognized element prior to being broadcast.

22 Claims, 8 Drawing Sheets (51) Int. Cl.
*H04N 21/442* (2011.01)
*G06F 17/30* (2006.01)
*H04N 7/088* (2006.01)
*H04N 7/16* (2011.01)
*H04N 21/258* (2011.01)
*H04N 21/2668* (2011.01)
*H04N 21/462* (2011.01)
*H04N 21/4782* (2011.01)
*H04N 21/81* (2011.01)
*H04N 21/858* (2011.01)
*H04N 21/434* (2011.01)
*H04N 21/45* (2011.01)

(56) References Cited

U.S. PATENT DOCUMENTS

| | | | |
|---|---|---|---|
| 5,485,221 A | 1/1996 | Banker et al. | |
| 5,563,648 A | 10/1996 | Menand et al. | |
| 5,579,057 A | 11/1996 | Banker et al. | |
| 5,592,551 A | 1/1997 | Lett et al. | |
| 5,600,364 A * | 2/1997 | Hendricks et al. | 725/9 |
| 5,631,694 A | 5/1997 | Aggarwal et al. | |
| 5,671,377 A | 9/1997 | Bleidt et al. | |
| 5,689,799 A | 11/1997 | Dougherty et al. | |
| 5,706,434 A | 1/1998 | Kremen et al. | |
| 5,708,845 A | 1/1998 | Wistendahl et al. | |
| 5,727,159 A | 3/1998 | Kikinis | |
| 5,742,680 A | 4/1998 | Wilson | |
| 5,774,660 A | 6/1998 | Brendel et al. | |
| 5,774,664 A | 6/1998 | Hidary et al. | |
| 5,774,666 A * | 6/1998 | Portuesi | 725/110 |
| 5,809,242 A | 9/1998 | Shaw et al. | |
| 5,819,269 A | 10/1998 | Uomini | |
| 5,826,258 A | 10/1998 | Gupta et al. | |
| 5,872,588 A | 2/1999 | Aras et al. | |
| 5,881,284 A | 3/1999 | Kubo | |
| 5,895,477 A | 4/1999 | Orr et al. | |
| 5,907,322 A | 5/1999 | Kelly et al. | |
| 5,925,595 A | 7/1999 | Seitz et al. | |
| 5,929,849 A * | 7/1999 | Kikinis | 725/113 |
| 5,937,331 A | 8/1999 | Kalluri et al. | |
| 5,961,603 A | 10/1999 | Kunkel et al. | |
| 5,969,715 A | 10/1999 | Dougherty et al. | |
| 5,982,445 A | 11/1999 | Eyer et al. | |
| 5,991,306 A | 11/1999 | Burns et al. | |
| 6,002,394 A | 12/1999 | Schein et al. | |
| 6,006,256 A | 12/1999 | Zdepski et al. | |
| 6,008,836 A | 12/1999 | Bruck et al. | |
| 6,014,134 A | 1/2000 | Bell et al. | |
| 6,014,502 A | 1/2000 | Moraes | |
| 6,018,764 A | 1/2000 | Field et al. | |
| 6,018,768 A | 1/2000 | Ullman et al. | |
| 6,025,837 A | 2/2000 | Matthews, III et al. | |
| 6,029,045 A | 2/2000 | Picco et al. | |
| 6,049,333 A | 4/2000 | LaJoie et al. | |
| 6,055,566 A | 4/2000 | Kikinis | |
| 6,061,056 A | 5/2000 | Menard et al. | |
| 6,076,734 A | 6/2000 | Dougherty et al. | |
| 6,101,510 A | 8/2000 | Stone et al. | |
| 6,122,658 A | 9/2000 | Chaddha | |
| 6,169,543 B1 | 1/2001 | Wehmeyer | |
| 6,177,931 B1 | 1/2001 | Alexander et al. | |
| 6,182,072 B1 | 1/2001 | Leak et al. | |
| 6,188,398 B1 | 2/2001 | Collins-Rector et al. | |
| 6,205,582 B1 | 3/2001 | Hoarty | |
| 6,209,130 B1 | 3/2001 | Rector et al. | |
| 6,219,042 B1 | 4/2001 | Anderson et al. | |
| 6,230,319 B1 | 5/2001 | Britt et al. | |
| 6,233,546 B1 | 5/2001 | Datig | |
| 6,233,592 B1 | 5/2001 | Schnelle et al. | |
| 6,237,022 B1 | 5/2001 | Bruck et al. | |
| 6,240,555 B1 | 5/2001 | Shoff et al. | |
| 6,253,238 B1 | 6/2001 | Lauder et al. | |
| 6,263,501 B1 | 7/2001 | Schein et al. | |
| 6,275,989 B1 | 8/2001 | Broadwin et al. | |
| 6,295,058 B1 | 9/2001 | Hsu et al. | |
| 6,297,853 B1 * | 10/2001 | Sharir et al. | 348/589 |
| 6,301,584 B1 | 10/2001 | Ranger | |
| 6,308,206 B1 | 10/2001 | Singh | |
| 6,327,574 B1 | 12/2001 | Kramer et al. | |
| 6,338,094 B1 | 1/2002 | Scott et al. | |
| 6,340,624 B1 | 1/2002 | Doan et al. | |
| 6,345,292 B1 | 2/2002 | Daugherty et al. | |
| 6,357,042 B2 | 3/2002 | Srinivasan et al. | |
| 6,363,525 B1 | 3/2002 | Dougherty et al. | |
| 6,415,303 B1 * | 7/2002 | Meier et al. | 715/500.1 |
| 6,424,717 B1 | 7/2002 | Pinder et al. | |
| 6,430,624 B1 | 8/2002 | Jamtgaard et al. | |
| 6,434,747 B1 | 8/2002 | Khoo et al. | |
| 6,446,261 B1 * | 9/2002 | Rosser | 725/34 |
| 6,457,103 B1 | 9/2002 | Challenger et al. | |
| 6,459,427 B1 | 10/2002 | Mao | |
| 6,460,180 B1 * | 10/2002 | Park et al. | 725/40 |
| 6,471,392 B1 | 10/2002 | Holl et al. | |
| 6,473,609 B1 | 10/2002 | Schwartz et al. | |
| 6,473,858 B1 | 10/2002 | Shimomura | |
| 6,496,981 B1 | 12/2002 | Wistendahl et al. | |
| 6,510,557 B1 | 1/2003 | Thrift | |
| 6,513,019 B2 | 1/2003 | Lewis | |
| 6,513,160 B2 | 1/2003 | Dureau | |
| 6,515,349 B2 | 2/2003 | Terashima | |
| 6,516,349 B1 | 2/2003 | Lieberman | |
| 6,518,950 B1 | 2/2003 | Dougherty et al. | |
| 6,536,041 B1 | 3/2003 | Knudson et al. | |
| 6,542,593 B1 | 4/2003 | Bowman-Amuah | |
| 6,546,488 B2 | 4/2003 | Dillon | |
| 6,547,754 B1 | 4/2003 | Evans et al. | |
| 6,553,409 B1 | 4/2003 | Zhang et al. | |
| 6,564,251 B2 | 5/2003 | Katariya et al. | |
| 6,564,263 B1 | 5/2003 | Bergman | |
| 6,571,392 B1 * | 5/2003 | Zigmond et al. | 725/110 |
| 6,574,793 B1 | 6/2003 | Ngo et al. | |
| 6,574,795 B1 | 6/2003 | Carr | |
| 6,577,346 B1 * | 6/2003 | Perlman | 348/460 |
| 6,584,153 B1 | 6/2003 | Gordon et al. | |
| 6,601,103 B1 * | 7/2003 | Goldschmidt Iki et al. | 709/231 |
| 6,614,914 B1 | 9/2003 | Rhoads et al. | |
| 6,615,408 B1 * | 9/2003 | Kaiser et al. | 725/112 |
| 6,637,032 B1 * | 10/2003 | Feinleib | 725/110 |
| 6,640,145 B2 | 10/2003 | Hoffberg et al. | |
| 6,643,652 B2 | 11/2003 | Helgeson et al. | |
| 6,651,218 B1 | 11/2003 | Adler et al. | |
| 6,654,754 B1 | 11/2003 | Knauft et al. | |
| 6,668,378 B2 * | 12/2003 | Leak et al. | 725/136 |
| 6,675,350 B1 | 1/2004 | Abrams et al. | |
| 6,676,350 B1 | 1/2004 | McSherry et al. | |
| 6,681,393 B1 | 1/2004 | Bauminger et al. | |
| 6,698,020 B1 * | 2/2004 | Zigmond et al. | 725/34 |
| 6,698,023 B2 | 2/2004 | Levitan | |
| 6,718,551 B1 | 4/2004 | Swix et al. | |
| 6,725,461 B1 | 4/2004 | Dougherty et al. | |
| 6,735,487 B1 | 5/2004 | Marshall et al. | |
| 6,742,043 B1 | 5/2004 | Moussa | |
| 6,745,368 B1 | 6/2004 | Boucher | |
| 6,750,919 B1 | 6/2004 | Rosser | |
| 6,756,997 B1 | 6/2004 | Ward, III et al. | |
| 6,779,154 B1 | 8/2004 | Nussbaum et al. | |
| 6,785,902 B1 | 8/2004 | Zigmond et al. | |
| 6,792,616 B1 | 9/2004 | Jerding et al. | |
| 6,799,326 B2 | 9/2004 | Boylan, III et al. | |
| 6,799,327 B1 | 9/2004 | Reynolds et al. | |
| 6,810,526 B1 | 10/2004 | Menard et al. | |
| 6,826,597 B1 | 11/2004 | Lonnroth et al. | |
| 6,839,903 B1 | 1/2005 | Shintani et al. | |
| 6,847,969 B1 | 1/2005 | Mathai et al. | |
| 6,925,595 B1 | 8/2005 | Whitledge et al. | |
| 6,934,963 B1 | 8/2005 | Reynolds et al. | |
| 6,938,270 B2 | 8/2005 | Blackketter et al. | |
| 6,941,474 B2 | 9/2005 | Boies et al. | |
| 6,941,574 B1 | 9/2005 | Broadwin et al. | |
| 7,028,327 B1 | 4/2006 | Dougherty et al. | |
| 7,062,777 B2 | 6/2006 | Alba et al. | |
| 7,079,176 B1 | 7/2006 | Freeman et al. | |

(56) References Cited

U.S. PATENT DOCUMENTS

| | | |
|---|---|---|
| 7,080,039 B1 | 7/2006 | Marsh |
| 7,100,183 B2 | 8/2006 | Kunkel et al. |
| 7,103,605 B1 | 9/2006 | Hazi et al. |
| 7,103,904 B1 | 9/2006 | Blackketter et al. |
| 7,143,042 B1 | 11/2006 | Sinai et al. |
| 7,222,155 B1 | 5/2007 | Gebhardt et al. |
| 7,222,163 B1 | 5/2007 | Girouard et al. |
| 7,287,018 B2 | 10/2007 | Lennon |
| 7,394,816 B1 | 7/2008 | Bill |
| 7,500,188 B1 | 3/2009 | Trapani et al. |
| 7,500,195 B2 | 3/2009 | Sahota et al. |
| 7,512,799 B1 | 3/2009 | Chow et al. |
| 7,530,016 B2 | 5/2009 | Sahota et al. |
| 7,631,338 B2 | 12/2009 | Del Sesto et al. |
| 7,634,787 B1 | 12/2009 | Gebhardt et al. |
| 7,650,376 B1 | 1/2010 | Blumenau |
| 7,653,923 B2 | 1/2010 | Flickinger |
| 7,668,963 B1 | 2/2010 | Miner et al. |
| 7,702,995 B2 | 4/2010 | Sahota et al. |
| 7,783,968 B2 | 8/2010 | Sahota et al. |
| 7,930,631 B2 | 4/2011 | Sahota et al. |
| 7,941,564 B2 | 5/2011 | Gebhardt et al. |
| 8,032,651 B2 | 10/2011 | Miner et al. |
| 8,079,045 B2 | 12/2011 | Krapf et al. |
| 8,296,792 B2 | 10/2012 | Sahota et al. |
| 8,650,480 B2 | 2/2014 | Sahota et al. |
| 8,667,387 B2 | 3/2014 | Sahota et al. |
| 8,667,530 B2 | 3/2014 | Sahota et al. |
| 8,935,719 B2 | 1/2015 | Sargent |
| 8,973,056 B2 | 3/2015 | Ellis et al. |
| 2001/0001160 A1 | 5/2001 | Shoff et al. |
| 2001/0003212 A1 | 6/2001 | Marler et al. |
| 2001/0003828 A1 | 6/2001 | Peterson et al. |
| 2001/0011265 A1 | 8/2001 | Cuan et al. |
| 2001/0023436 A1 | 9/2001 | Srinivasan et al. |
| 2001/0027491 A1 | 10/2001 | Terretta et al. |
| 2001/0037500 A1* | 11/2001 | Reynolds et al. ............ 725/36 |
| 2001/0047298 A1* | 11/2001 | Moore et al. ............... 705/14 |
| 2001/0047518 A1 | 11/2001 | Sahota et al. |
| 2001/0051031 A1 | 12/2001 | Hada et al. |
| 2001/0054031 A1 | 12/2001 | Lee et al. |
| 2001/0056460 A1 | 12/2001 | Sahota et al. |
| 2002/0010928 A1 | 1/2002 | Sahota |
| 2002/0011265 A1 | 1/2002 | Ganachaud |
| 2002/0046237 A1 | 4/2002 | Yokokura |
| 2002/0046273 A1 | 4/2002 | Lahr et al. |
| 2002/0049749 A1 | 4/2002 | Helgeson et al. |
| 2002/0056087 A1 | 5/2002 | Berezowski et al. |
| 2002/0075403 A1 | 6/2002 | Barone et al. |
| 2002/0104086 A1 | 8/2002 | Tomsen et al. |
| 2002/0184627 A1 | 12/2002 | Alba et al. |
| 2003/0023971 A1* | 1/2003 | Martinolich et al. .......... 725/32 |
| 2003/0028873 A1 | 2/2003 | Lemmons |
| 2003/0149581 A1 | 8/2003 | Chaudhri et al. |
| 2004/0006747 A1 | 1/2004 | Tyler |
| 2004/0133910 A1 | 7/2004 | Gordon et al. |
| 2005/0108633 A1 | 5/2005 | Sahota et al. |
| 2005/0108634 A1 | 5/2005 | Sahota et al. |
| 2005/0108637 A1 | 5/2005 | Sahota et al. |
| 2005/0114757 A1 | 5/2005 | Sahota |
| 2005/0132420 A1 | 6/2005 | Howard et al. |
| 2005/0193410 A1 | 9/2005 | Eldering |
| 2005/0216932 A1 | 9/2005 | Danker |
| 2006/0143655 A1 | 6/2006 | Ellis et al. |
| 2007/0136753 A1 | 6/2007 | Bovenschulte et al. |
| 2007/0157249 A1 | 7/2007 | Cordray et al. |
| 2007/0162961 A1 | 7/2007 | Tarrance et al. |
| 2008/0010659 A1 | 1/2008 | Zenith |
| 2008/0109843 A1 | 5/2008 | Ullah |
| 2008/0215428 A1 | 9/2008 | Ramer et al. |
| 2008/0319852 A1 | 12/2008 | Gardner et al. |
| 2009/0119723 A1 | 5/2009 | Tinsman |
| 2009/0193456 A1 | 7/2009 | Ahn et al. |
| 2009/0199114 A1 | 8/2009 | Lewis et al. |
| 2009/0254931 A1 | 10/2009 | Pizzurro et al. |
| 2010/0161826 A1 | 6/2010 | Miner et al. |
| 2010/0171741 A1 | 7/2010 | Brill et al. |
| 2010/0174783 A1 | 7/2010 | Zarom |
| 2010/0251279 A1 | 9/2010 | Piard et al. |
| 2010/0268773 A1 | 10/2010 | Hunt |
| 2010/0333153 A1 | 12/2010 | Sahota et al. |
| 2011/0119478 A1 | 5/2011 | Jackson |
| 2011/0191667 A1 | 8/2011 | Sahota et al. |
| 2012/0084812 A1 | 4/2012 | Thompson et al. |
| 2012/0117584 A1 | 5/2012 | Gordon |
| 2012/0189272 A1 | 7/2012 | Kunigita et al. |
| 2013/0014192 A1 | 1/2013 | Sahota et al. |
| 2013/0051770 A1 | 2/2013 | Sargent |
| 2013/0117406 A1 | 5/2013 | Chevillat et al. |
| 2013/0144725 A1 | 6/2013 | Li et al. |
| 2013/0179925 A1 | 7/2013 | Woods et al. |
| 2013/0205343 A1 | 8/2013 | Kirby |
| 2014/0053223 A1 | 2/2014 | Vorobyov et al. |
| 2014/0130085 A1 | 5/2014 | Sahota et al. |
| 2014/0189500 A1 | 7/2014 | Sahota et al. |
| 2014/0201769 A1 | 7/2014 | Neumeier et al. |
| 2014/0282653 A1 | 9/2014 | Ariantaj et al. |
| 2014/0282735 A1 | 9/2014 | Davis et al. |
| 2014/0379855 A1 | 12/2014 | Sahota et al. |
| 2015/0156564 A1 | 6/2015 | Sargent |
| 2015/0256903 A1 | 9/2015 | Walker |

FOREIGN PATENT DOCUMENTS

| | | |
|---|---|---|
| EP | 0 942 595 A2 | 9/1999 |
| EP | 1269750 A1 | 1/2003 |
| EP | 1286541 A1 | 2/2003 |
| EP | 1381961 A1 | 1/2004 |
| EP | 1826981 A1 | 8/2007 |
| EP | 1954054 A1 | 8/2008 |
| WO | 0078043 A1 | 12/2000 |
| WO | 0158159 A1 | 8/2001 |
| WO | 0182613 A1 | 11/2001 |
| WO | 02086746 A1 | 10/2002 |
| WO | 03017129 A1 | 2/2003 |

OTHER PUBLICATIONS

International Search Report, Sep. 10, 2001.

"Advanced Television Enhancement Forum Specification (ATVEF)", ATVEF, 34 pages, Feb. 2, 1999.

International Preliminary Examination Report, PCT/US01/13244, mailed Feb. 18, 2003 (11 pages).

US 6,542,592, 4/2003, Bowman-Amuah (withdrawn).

International Search Report for International Application No. PCT/US01/13243 (Metatv, Inc.) dated Oct. 10, 2001.

"Microsoft Computer Dictionary," Microsoft Press, Third Ed., 1997, p. 505.

Arens, Y. et al. "Intelligent Caching: Selecting, Representing, and Reusing Data in an Information Server," Proc. of the Third Internatioanl Conf. on Information and Knowledge Management, Nov. 1994, pp. 433-438.

Bayardo, R. et al., "InfoSleuth: Agent-Based Semantic Integration of Information in Open and Dynamic Environments," ACM SIGMOD Record, Jun. 1997, vol. 26, Issue 2, pp. 195-206.

Bulterman, D., "Embedded Video in Hypermedia Documents: Supporting Integration and Adaptive Control," ACM Transaction on Information System (TOIS), Oct. 1995, vol. 13, Issue 4, pp. 440-470.

Calvary, G. et al., "From Single-User Architectural Design to PAC a Generic Software Architecture Model for CSCS," Proc. of the SIGCHI Conf. on Human Factors in Computer Systems, Mar. 1997, pp. 342-349.

Claypool K. et al., "QQL_SERF: An ODMG implementation of the Template-Based Scheme Evolution Framework," Proc. of the 1998 Conf. of the Centre of Advanced Studies on Collaborative Research, Nov. 1998, pp. 1-15.

Ensink, B. et al, "XML Based Adaptation of the Composite Approach for Database Integration", Proceedings of the 37th Annual Southeast Regional Conference (CD-ROM), Apr. 1999, pp. 1-6.

(56) References Cited

OTHER PUBLICATIONS

Fraisse, S. et al "Generating hypermedia for specifications by sketching multimedia templates," In Proceedings of the Fourth ACM International Conference on Multimedia (Boston, MA, Nov. 18-22, 1996) Multimedia '96. ACM, New York, NY, 353-364.

Glushko, R. et al, "An XML Framework for Agent-Based E-Commerce", Communications of the ACM, vol. 42, No. 3, Mar. 1999, pp. 106-114.

Hiijiri, T., et al, "A spatial Hierarchical Compression Method for 3D Streaming Animation" Proceedings of the Fifth Sumposium on Virtual Reality Modeling Language (Web3D-VRML), Feb. 2000, pp. 95-101.

Lyengar A. et al., "Improving Web Server Performance by Caching Dynamic Data," In Proceedings of the USENIX Symposium on Internet Technologies and Systems, Dec. 1997, pp. 1-13.

Puder, A., et al, "Position Papers: System Support for Knowledge-Based Trading in Open Service Markets", Proceedings of the 7th Workshop on ACM SIGOPS European Workship: Systems Support for Worldwide Applications, Sep. 1996, pp. 289-296.

Puerta, A. et al. "Towards a general computational framework for model-based interface development systems," In Proceedings of the 4th International Conference on Intelligent User Interfaces (Los Angeles, CA, Jan. 5-8, 1999). IUI '99. ACM, New York, NY 171-178.

Shim, S. et al., "Template Based Synchronized Multimedia Integration Language Authorizing Tool," SPIE Conference on Internet Imaging, Dec. 1999, vol. 3964, pp. 134-142.

Spencer, Ken, "Using XML to Build Internet Solutions", Windows IT Pro, http://www.winntmag.com/Articles/Print.cfm?ArticleID=5056, Apr. 1999.

Wegner, L. et al, "Applications: A Visual Interface for Synchronous Collaboration and Negotiated Transactions", Proceedings of the Workshop on Advanced Visual Interfaces, May 1996, pp. 156-165.

Palmer, J.W. And Eriksen, L.B. 1999. Digital newspapers explore marketing on the Internet, Commun. ACM 42, 9 (Sep. 1999), 32-40.

Hodes, T.D. and Katz, R.H. 1999. Composable ad hoc location-based services for heterogenerous mobile clients. Netw. 5,5 (Oct. 1999), 411-427.

Kuchling, Andrew, "XML, the eXtensible Markup Language", Linus Journal, Specialized Systems Consultants, Inc., Nov. 1998, pp. -3.

Smith, John R., et al "Scalable Multimedia Delivery for Pervasive Computing", Proceedings of the Seventh ACM International Conference on Multimedia (Part 1), Oct. 1999, pp. 131-140.

"Spyglass Prism: Concepts and Applications", Spyglass Inc. 1997, pp. 1-10.

"XHTML 1.0: The Extensible HyperText Markup Language, A Reformulation of HTML 4.0 in XML 1.0", www.w3.org, downloaded from http://www.w3.org/TR/1999/WD-html-in-xml-19990224/,pp. 1-15.

Microsoft Computer Dictionary, Third Edition, Microsoft Press, 1997, pp. 368.

International Search Report for International Application No. PCT/US01/13241 (Metatv, Inc.),dated Sep. 10, 2001.

Barta, Robert, et al, "Syndication with JML", Proceedings of the 2000 ACM Symposium on Applied Computing—vol. 2, ACM Press, Mar. 2000, pp. 962-970.

US 6,542,592, 7/2002, Beebe et al. (withdrawn).

Advanced Television Systems Committee, Inc., "ATSC Standard: Programming Metadata Communication Protocol, Revision B," Document A/76B, 52 pages (Jan. 14, 2008).

Heather Wilner, "Verizon FiOS Brings You the 2012 London Summer Olympic Games," 3 pages, available at <http://forums.verizon.com/t5/Verizon-at-Home/Verizon-FiOS-Brings-You-the-2012-London-Summer-Olympic-Games/ba-p/462267> (Jul. 23, 2012, accessed Mar. 5, 2014).

Extended European Search Report—EP 14159424.2—Mailing Date: May 13, 2014.

Extended European Search Report—EP Appl. 15158005.7—dated Jul. 29, 2015.

U.S. Appl. No. 09/841,149, Method and system for integrating internet advertising with television commercials, filed Apr. 23, 2001.

U.S. Appl. No. 13/800,579, Selective Interactivity, filed Mar. 13, 2013.

U.S. Appl. No. 14/200,508, Retrieving Supplemental Content, filed Mar. 7, 2014.

U.S. Appl. No. 14/139,990, Method and System for Transforming Content for Execution on Multiple Platforms, Dec. 24, 2013.

U.S. Appl. No. 14/153,273, Method and System to Provide Interactivity Using an Interactive Channel Bug, Jan. 13, 2014.

U.S. Appl. No. 14/186,616, Method and System for Transforming Content for Execution on Multiple Platforms, Feb. 21, 2014.

U.S. Appl. No. 14/554,258, Application triggering, Nov. 26, 2014.

European Office Action—EP App 14159424.2—Dated Sep. 27, 2016.

\* cited by examiner

METHOD AND SYSTEM FOR AUTOMATIC INSERTION OF INTERACTIVE TV TRIGGERS INTO A BROADCAST DATA STREAM

RELATED APPLICATION

This application is related to and claims priority to U.S. Provisional Application No. 60/199,686, entitled, "METHOD AND SYSTEM FOR TRANSFORMING CONTENT FOR EXECUTION ON MULTIPLE PLATFORMS," filed on Apr. 24, 2000, the disclosure of which is hereby incorporated herein by reference.

FIELD OF THE INVENTION

The present invention pertains to the field of interactive television. More particularly, the present invention relates to a method and system for automatic insertion of interactive television (TV) triggers into a broadcast data stream.

BACKGROUND OF THE INVENTION

Today, advancements in television systems provide a wide variety of services and application for television users. One such advancement is interactive television ("iTV"). In an iTV environment, a TV user can interact with a broadcast or service being provided on the TV. For example, a broadcast may include enhanced, interactive content ("interactive content") such as a Universal Resource Locator (URL) address in which a TV user can select to access a website on the Internet or World Wide Web at the selected URL address.

In current iTV systems, if a broadcaster wants to broadcast programs with interactive content, the broadcaster must manually modify each program to add the interactive content prior to broadcasting. As such, a disadvantage of using current iTV is the substantial effort required to add interactive content to broadcast programs. Another disadvantage of using current iTV systems is the unwanted delay in deploying interactive content with broadcast programs.

SUMMARY OF THE INVENTION

A method and system are disclosed for automatic insertion of interactive television (TV) triggers into a broadcast data stream. In one embodiment, the automatic insertion of the Interactive TV trigger is based on recognition of one or more elements within the broadcast data stream. In particular, a recognized element can trigger the insertion of the interactive TV trigger into the broadcast data stream. In another embodiment, the interactive TV trigger is pre-inserted into the stored broadcast content having the recognized element prior to being broadcast.

Other features of the present invention will be apparent from the accompanying drawings and from the detailed description which follows.

BRIEF DESCRIPTION OF THE DRAWINGS

The present invention is illustrated by way of example, and not limitation, in the figures of the accompanying drawings, in which like references indicate similar elements and in which.

DETAILED DESCRIPTION

A method and system are described for automatic insertion of interactive television (TV) triggers into a broadcast data stream. In one embodiment, the automatic insertion of the Interactive TV trigger is based on recognition of one or more elements within the broadcast data stream. In particular, a recognized element can trigger the insertion of the interactive TV trigger into the broadcast data stream. In another embodiment, the interactive TV trigger is pre-inserted into the stored broadcast content having the recognized element prior to being broadcast.

The following embodiments allow interactive content (e.g., an interactive TV trigger) to be automatically inserted into a broadcast data stream avoiding manual modification of the broadcast data stream. The following embodiments allow for easy and rapid deployment and insertion of interactive content into a broadcast data stream.

Furthermore, in the following embodiments, an interactive TV trigger can refer to any number of types of interactive content supported by a number of interactive content standards. For example, an interactive TV trigger can be based on an enhanced, interactive content standard such as Advanced Television Enhancement Forum (ATVEF) standard for Transport Type A or Transport Type B, Internet Protocol (IP) Multicasting standard, Multi Protocol Encapsulation for Digital Video Broadcasting (DVB), or Broadcast Hypertext Markup Language (HTML) standards being developed for Digital Television (DTV).

Figure 1A:
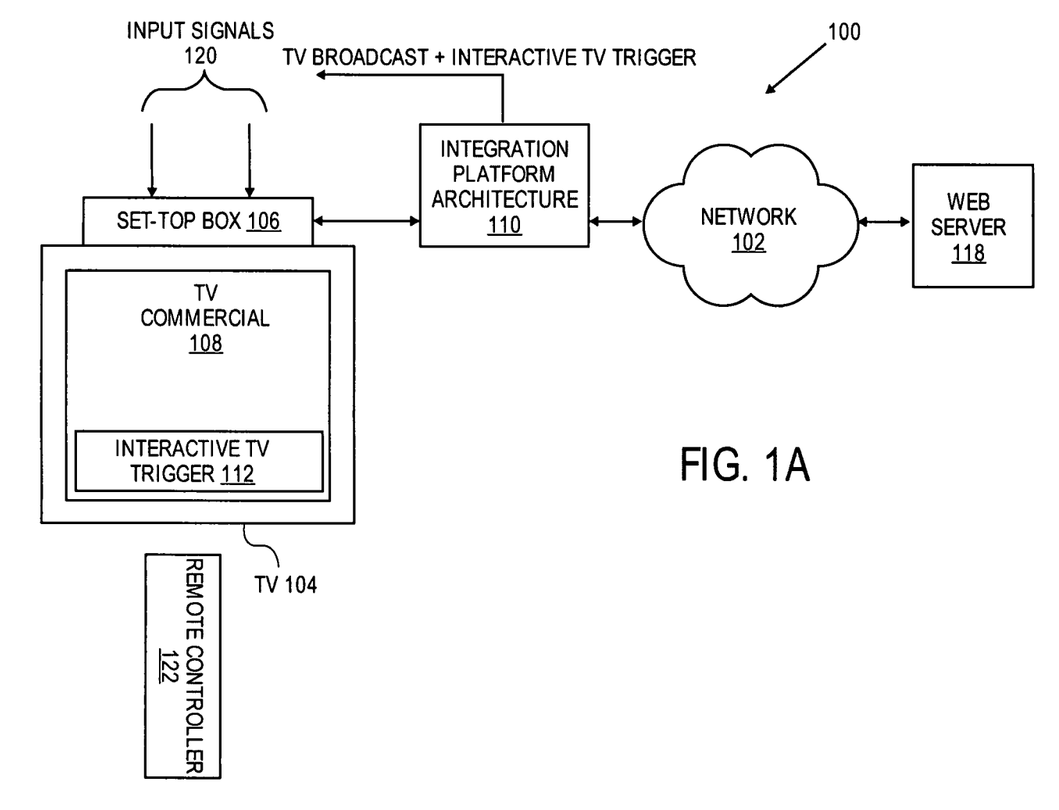
FIG. 1A illustrates an exemplary interactive television system having an insertion platform architecture in which the present invention can be practiced.

FIG. 1A illustrates an exemplary interactive television system 100 having insertion platform architecture 110 in which the present invention can be practiced. Referring to FIG. 1A, interactive television system 100 includes a set-top box 106 connected to a TV 104. Set-top box 106 and TV 104 can receive inputs from a remote controller 122. TV 104 is shown to have a network 102 connection capabilities. That is, TV 104 can be connected to network 102 via set-top box 106. In one embodiment, TV 104 can receive and display TV broadcast 108 with interactive TV trigger 112. Interactive TV trigger 112 can be used to retrieve information from web server 118. For example, a user can select or access interactive TV trigger 112 to retrieve a web page from web server 118 for display on TV 104. Set-top box 106 can also be connected to network 102 through insertion platform architecture 110 or directly through an input/output (I/O) interface such as a telephone line.

Set-top box 106 is a receiver for TV 104. Set-top box 106 is compliant for enhanced, interactive television content. For example, set-top box 106 can be compliant for the Advanced Television Enhancement Forum (ATVEF) standard for Transport Type A or Transport Type B delivery of enhanced, interactive television content. ATVEF defines a standard to create and deliver enhanced content for a number of mediums including analog (NTSC) or digital (ATSC) mediums from a number of sources such as, for example, terrestrial, cable, or satellite sources. TV 104 is a display device. TV 104 can support analog, Digital Video Broadcasting (DVB), Advanced Television Systems Committee (ATSC) or any of the other known TV standards.

Set-top box receives input signals 120 (e.g., television signals) to display on TV 104. Input signals 120 can be broadcast signals from a plurality of programming sources. For example, set-top box 106 can receive broadcast signals as input signals 120 from a terrestrial, cable, or satellite source. Input signals 120 can be analog or digital signals. Set-top box 106 can provide on-screen displays (OSDs) or graphical user interfaces (GUIs) to facilitate interactive services, e.g., accessing content on the Internet. As shown in FIG. 1A, set-top box 106 can be controlled by a user of remote controller 122. Alternatively, set-top box 106 can be controlled by other types of input devices such as, for example, an infrared (IR) keyboard.

Insertion platform architecture 110 can be a computing system having multiple sub-systems for performing the content insertion techniques described herein. Alternatively, insertion platform architecture 110 can include hardware and/or software modules operating within set-top box 106 to perform the content insertion techniques described herein. For purposes of illustration, insertion platform architecture 110 is an external system to set-top box 106.

Insertion platform architecture 110 provides input for set-top box 106. In one embodiment, insertion platform architecture 110 provides set-top box 106 with a TV broadcast 108 along with interactive TV trigger 112 as input for input signals 120. As will be described in further detail below, insertion platform architecture automatically inserts interactive TV trigger 112 into TV broadcast 108. In one embodiment, insertion platform architecture 110 automatically inserts interactive TV trigger 112 into TV broadcast 108 based on the elements contained within TV broadcast 108. For instance, insertion platform architecture 110 can associate elements within TV broadcast 108 with a specific interactive element (e.g., interactive TV trigger 112), which is to be inserted into TV broadcast 108. In an alternative embodiment, insertion platform architecture 110 pre-inserts the interactive TV trigger 112 into TV broadcast having recognized elements.

Insertion platform architecture 110 can include one or more databases to store attributes that are used to match with elements within TV broadcast 108. In another embodiment, insertion platform architecture 110 sends interactive TV trigger 112 to insertion module 107 within set-top box 106, and insertion module 107 automatically inserts interactive TV trigger 112 into TV broadcast 108 received by set-top box 106.

Network 102 can represent a network such as the Internet hosting the World Wide Web (WWW). The WWW allows for a uniform way of accessing information on the Internet using HTML compliant browsers. Network 102 can be other type of networks such as, for example, a local area network (LAN) or a wide area network (WAN). Network 102 can also represent wired or wireless networks. Although one web server 102 is shown in FIG. 1A, any number of web servers can be connected to network 102. Furthermore, other types of network devices can also be connected to network 102, which can provide content for TV 104, such as, for example, a network router, bridge, gateway, or other like network devices.

Remote controller 122 is a control device for a user to provide inputs (e.g., infrared (IR) or radio frequency (RF) signals to set-top box 106 and/or TV 104.) Remote controller 122 can include alphanumeric keys, options keys, functions keys, and other like keys to operate set-top box 106 or TV 104. In one embodiment, a user can interact with interactive TV trigger 112 using remote controller 122. In particular, a user can access and navigate through a browser (not shown) operating on TV 104 by pressing selectively certain buttons or keys on remote controller 122. Interactive television system 100 can also be implemented in numerous configurations. For example, TV 104 can have the functionality of set-top box 106 contained internally. In addition, TV 104 can also be a computing device, which can display television signals.

Figure 1B:
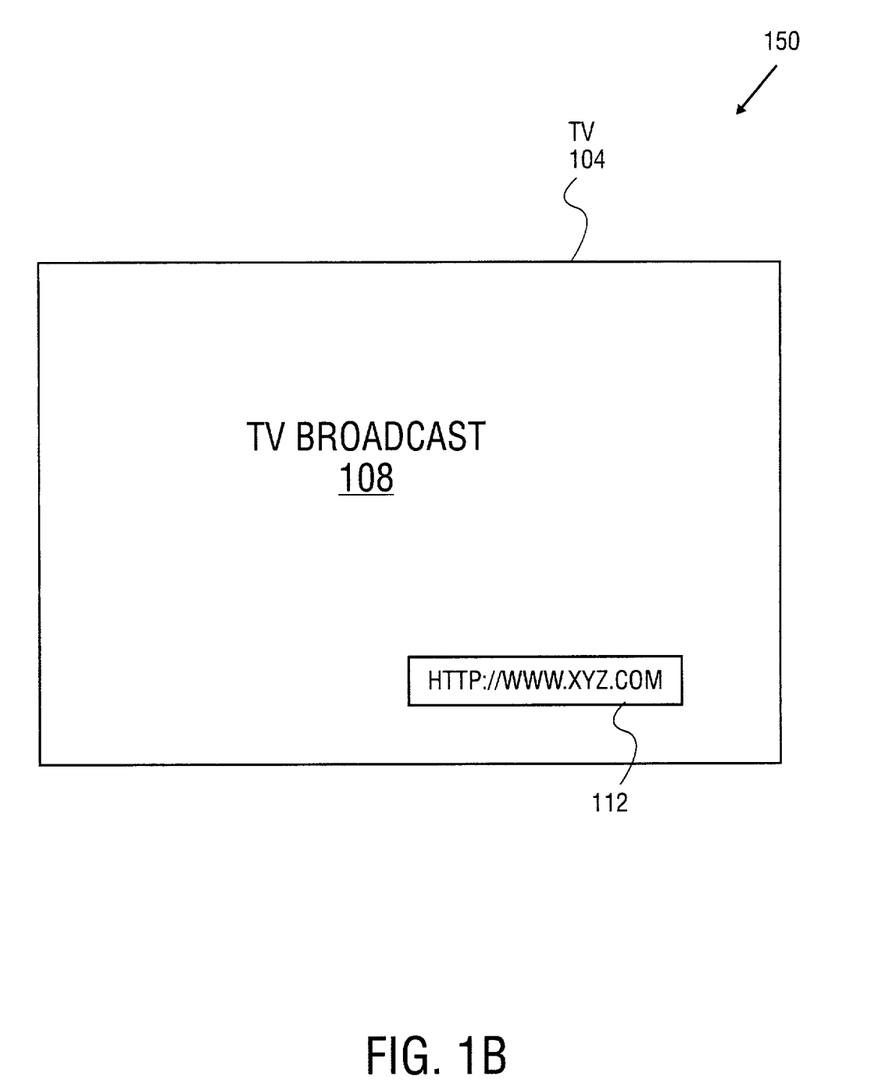
FIG. 1B illustrates an exemplary screen shot of a TV broadcast including an interactive TV trigger.

FIG. 1B illustrates an exemplary screen shot 150 of TV broadcast 108 including interactive TV trigger 112. Interactive TV trigger 112 can be automatically inserted into TV broadcast 112 by insertion platform architecture 110. Alternatively, set-top box 106 can automatically insert interactive TV trigger 112 into TV broadcast 108. Referring to FIG. 1B, TV 104 displays TV broadcast 108 with interactive TV trigger 112 as Universal Resource Location (URL) content ("http://www.xyz.com"). The URL location is exemplary for a website location on the Internet related to TV broadcast 108. For example, TV broadcast 108 may be a clothing store commercial and the exemplary URL location may the location of a website owned and operated by the clothing store.

In one embodiment, interactive TV trigger 112 is an ATVEF trigger. An ATVEF trigger is a data mechanism to alert receivers (e.g., set-top box 106) of incoming content enhancements. In particular, ATVEF triggers include information about enhancements that are available to the user. For example, interactive TV trigger 112 can be an ATVEF trigger that includes a URL location as shown in FIG. 1B. Interactive TV trigger 112 can be broadcasted to set-top box 106 with TV broadcast 108. In one embodiment, interactive TV trigger 112 is enhanced content, which may be already stored within set-top box 106. In another embodiment, interactive TV trigger 112 may include readable description of content such as, for example, "press the browse button for more information about the product being advertised," which can be displayed on TV 104 by set-top box 106. Interactive TV trigger 112 can also include JavaScript code. For example, interactive TV trigger 112 can be used to execute another piece of JavaScript code within a web page on the Internet.

Figure 2:
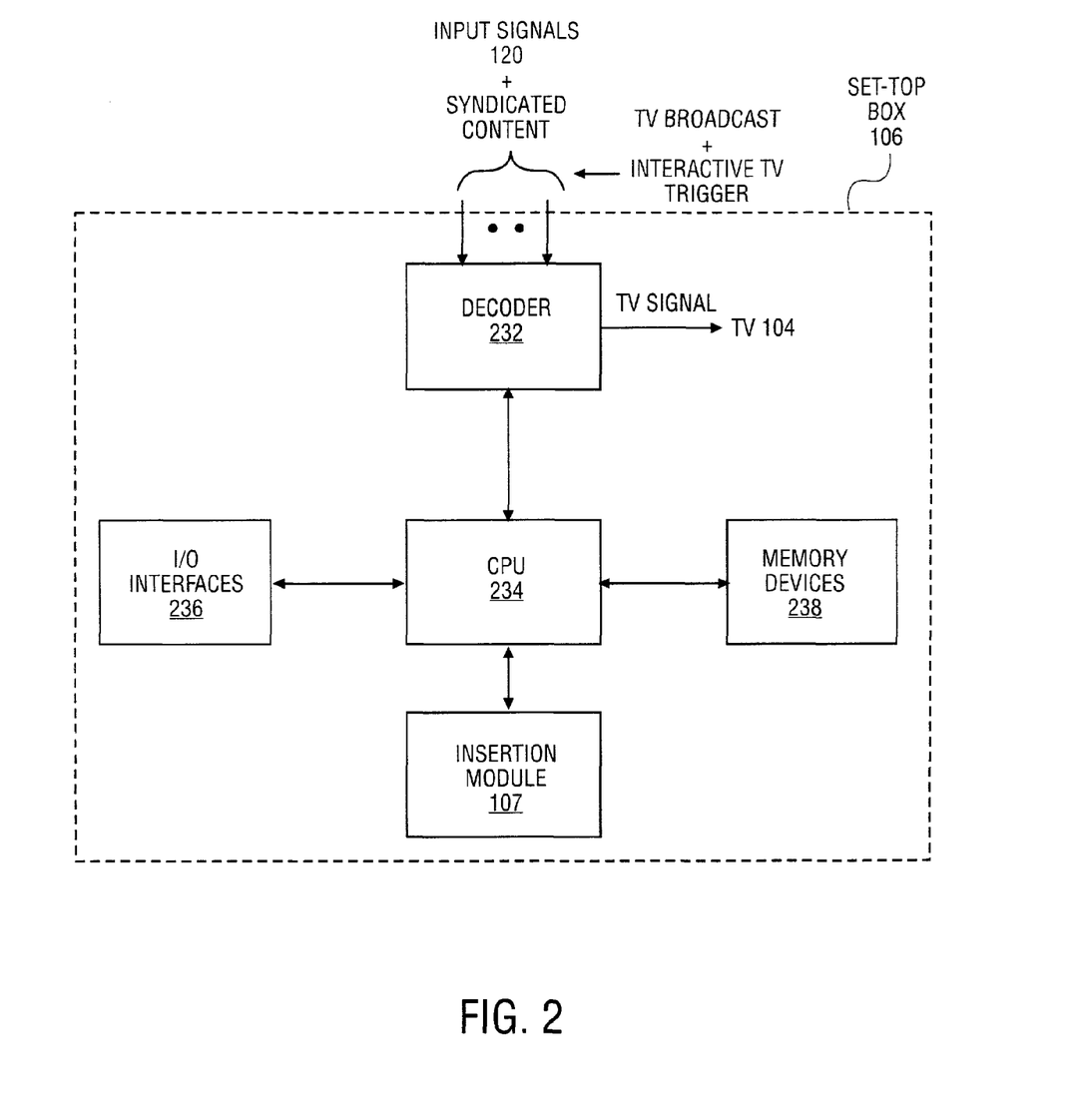
FIG. 2 illustrates a simplified block diagram of the set-top box of FIG. 1A having an insertion module according to one embodiment.

FIG. 2 illustrates a simplified block diagram of set-top box 106 of FIG. 1A having insertion module 107 according to one embodiment. For purposes of clarity, only the basic components of set-top box 106 are shown in block diagram form. Set-top box 106 is configured to provide enhanced, interactive television content services.

Referring to FIG. 2, set-top box 106 includes a central processing unit (CPU) 234 coupled to memory devices 238, input/output (I/O) interfaces 236, decoder 232, and insertion module 107. Decoder 232 can receive inputs signals 120. In one embodiment, one of the input signals 120 is TV broadcast 108 with interactive TV trigger 112. Interactive TV trigger 112 can be enhanced, interactive television content.

Decoder 232 can receive input signals 120 as analog (NTSC) or digital (ATSC) signals from a number sources including terrestrial, cable, and satellite sources. Decoder 232 decodes and outputs a TV signal to TV 104. The TV signal can include TV broadcast 108 and/or interactive TV trigger 112.

CPU 234 is the central control mechanism for set-top box 106. CPU 234 can execute code or instructions stored in memory devices 238 or stored in insertion module 107 or external storage devices via network 102. For example, I/O interfaces 236 may include a connection to network 102 provided by a dial-up modem. I/O interfaces 236 can also include an (IR) or (RF) interface for receiving inputs from remote controller 122. CPU 234 can also execute code or instructions to authorize decoder 232 to output automatically interactive TV trigger 112 with TV broadcast 108 from insertion platform architecture 110 on TV 104. In one embodiment, CPU 234 can execute software modules within insertion module 107 to insert automatically interactive TV trigger 112 into TV broadcast 108 within set-top box 106 for display on TV 104.

Insertion module 107 includes hardware and/or software modules to process interactive TV triggers from insertion platform architecture 110. Insertion module 107 can automatically insert interactive TV trigger 112 into TV broadcast 108 in which interactive TV trigger 112 was received from insertion platform architecture 110. In one embodiment, insertion module 107 can process a pre-stored interactive TV trigger 112 within set-top box 106 and automatically insert interactive TV trigger 112 into TV broadcast 108. Insertion module 107 can also automatically insert interactive TV trigger 112 into TV broadcast based on a specific pattern within TV broadcast 108. That is, if a specific pattern is recognized, insertion module 107 can insert interactive TV trigger 112 into TV broadcast 108.

Memory devices 238 can include a machine-readable medium that provides (i.e., stores and/or transmits) information in a form readable, e.g., by CPU 234. Memory devices 208 may include a read only memory (ROM), random access memory (RAM), magnetic disk storage media, optical storage media, or flash memory devices. The code or instructions stored in memory devices 238 can be represented by carrier wave signals, infrared signals, digital signals, and by other like signals.

Figure 3:
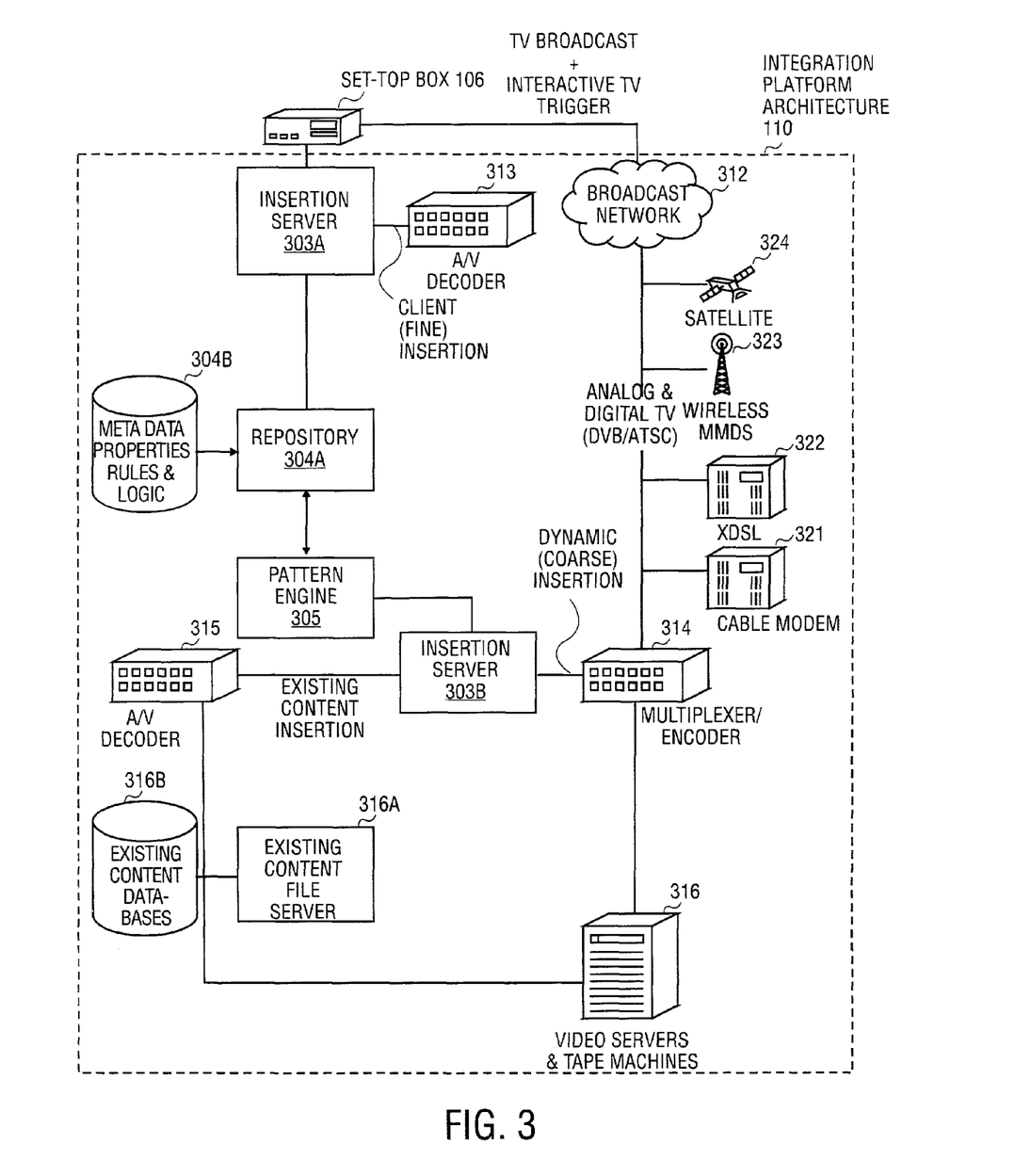
FIG. 3 illustrates a block diagram of the insertion platform architecture of FIG. 1A according to one embodiment.

FIG. 3 illustrates a block diagram of insertion platform architecture 110 of FIG. 1A according to one embodiment. Insertion platform architecture 110 provides details of the subsystems and networks to insert automatically interactive TV triggers into a TV broadcast. The subsystems can include hardware and/or software modules to insert content as described herein. For purposes of illustration, insertion platform architecture 110 is shown communicating with a single set-top box 106. Insertion platform architecture 110, however, can be implemented to communicate with a plurality of set-top boxes.

Referring to FIG. 3, set-top box 106 can receive a TV broadcast from a plurality of sources such as satellite source 324, wireless Multipoint Microwave Distribution System (MMDS) source 323, x digital subscriber loop (DSL) source 322, cable modem source 321, and a video server and tape machine source 316 via broadcast network 312. Insertion platform architecture 110 includes insertion server 303A, audio/video (A/V) decoder 313, repository 304A, properties, rules & logic 304B, pattern engine 305, insertion server 303B, A/V decoder 315, existing content file server 316A, existing content databases 316B, and multiplexer/encoder 314.

Two insertion servers 303A and 303B can be used to insert automatically interactive TV trigger 112 into TV broadcast 108. Insertion servers 303A and 303B can be a general purpose computing system, workstation, or client server. In one embodiment, insertion server 303A provides automatic dynamic insertion of interactive content into a broadcast data stream from audio/video (A/V) decoder 313 based on a fine personalization that is performed at the set-top box 106. Thus, in one embodiment, insertion server 303A can be considered to operate within the context or environment of set-top box 106, having access to viewer or profile information therein. In one embodiment, insertion server 303B provides automatic pre-insertion of interactive content into existent content stored in existing content databases 316B, which is controlled by existing content file server 316A. In another embodiment, insertion server 303B provides automatic dynamic insertion of interactive content into a broadcast data stream provided by multiplexer/encoder 314 based on coarse or fine personalization. The insertion and personalization process for insertion servers 303A and 303B will be discussed in further detail with respect to FIG. 4.

Insertion servers 303A and 303B interface with A/V decoder 313, A/V decoder 315 and multiplexer/encoder 314, respectively. In one embodiment, multiplexer/encoder 314 can provide ATVEF, VBI Encoding, MPEG Multiplexing, or IP encapsulation services to insert interactive content (e.g., interactive TV trigger 112) provided insertion server 303B into a broadcast data stream (e.g., TV broadcast 108). In one embodiment, the formatting and structure of the content is based on ATVEF broadcast and delivery standards. Insertion server 303A and 303B manage the delivery and insertion of interactive content into broadcast data streams content, triggers and media to the TV & data broadcast ("TV broadcast").

Repository 304A is a facility to access database 304B storing meta-data, properties, rules & logic and pattern engine 305 to drive the interactive content insertion process for insertion servers 303A and 303B. Repository 304A can be a general purpose computing system, workstation, or client server. Repository communicates and provides information and data to insertion server 303A and insertion server 303B. In one embodiment, repository 304A provides interactive keys, attributes and interactive content to insertion servers 303A and 303B. The keys, attributes and interactive content can be stored in database 304B.

In one embodiment, database 304B stores interactive elements and attributes and a dictionary to associate interactive elements with pre-determined media assets in a broadcast data stream based on attributes of the interactive elements. That is, if a media asset is found in a broadcast data stream, the associated interactive element can be inserted into the broadcast data stream. Such a process will be explained in the following embodiments. Pattern engine 305 is a hardware and/or software module used to identify, locate or find the pattern or type of asset in filtering a broadcast data stream. Alternatively, pattern engine 305 can be a separate server similar to repository 304A. For example, pattern engine 305 can supply instructions to insertion servers 303A and 303B to insert interactive TV trigger 112 into TV broadcast 108 if it contains a media asset having a pattern "A" based on the meta-data, properties and rules stored in database 304B.

Figure 4:
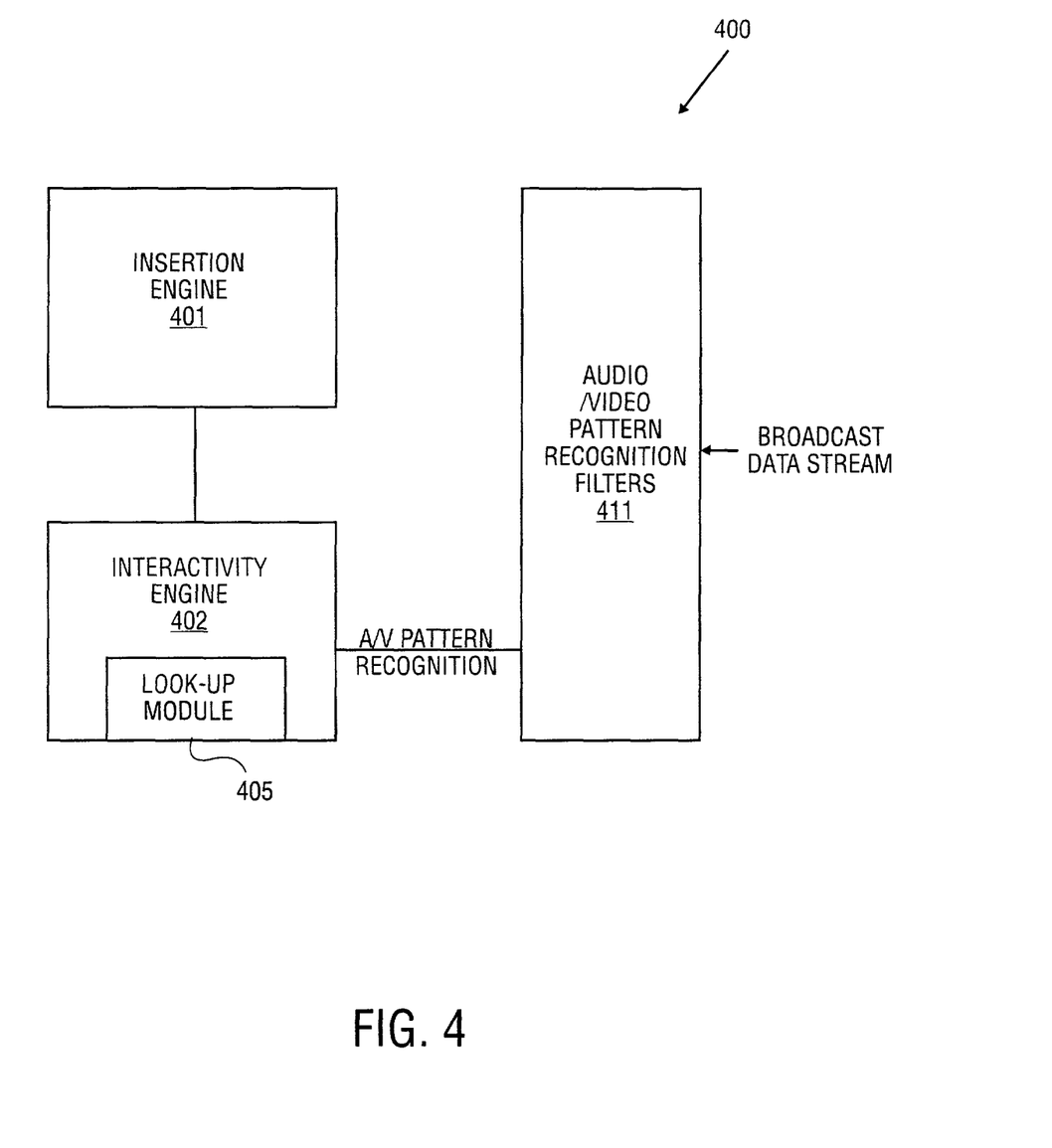
FIG. 4 illustrates an internal block diagram of an insertion server of FIG. 3 according to one embodiment.

FIG. 4 illustrates an internal block diagram 400 an insertion server of FIG. 3 according to one embodiment. Referring to FIG. 4, block diagram 400 can represent internal components for both insertion server 303A and 303B of FIG.

3, which includes an interactivity engine 402 coupled with an audio/video pattern recognition filters 411 and insertion engine 401.

Figure 6A:
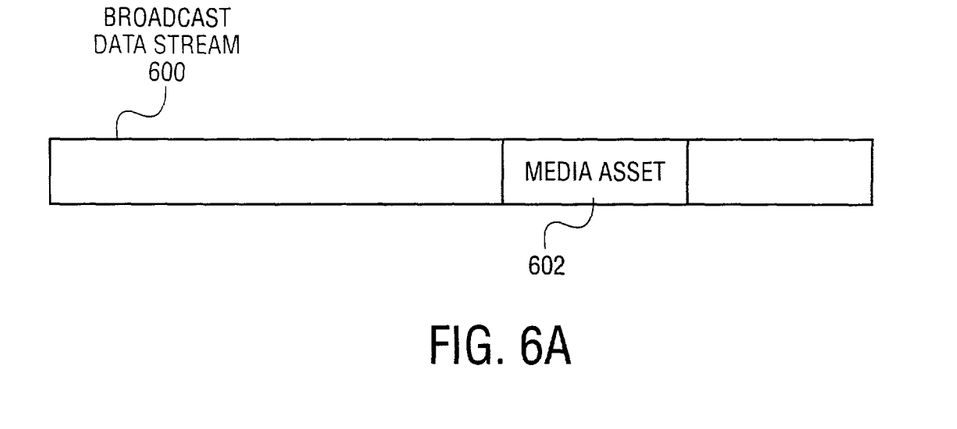
FIG. 6A illustrates a broadcast data stream having a media asset according to one embodiment.

Audio/video pattern recognition filters 411 are hardware and/or software modules used to recognize specific media assets with a broadcast data stream. For example, audio/video pattern recognition filters 411 can filter broadcast data stream 600 for a specific media asset 602 such as that shown in FIG. 6A. Media asset 602 can have a specific pattern, e.g., a pattern "A." Audio/video pattern recognition filters 411 can receive instructions to recognize pattern "A" for media asset 602 (e.g., pattern "A") within broadcast data stream 600. If the pattern is found, audio/video pattern recognition filters 411 informs interactivity engine 402 that the pattern was found.

Figure 6B:
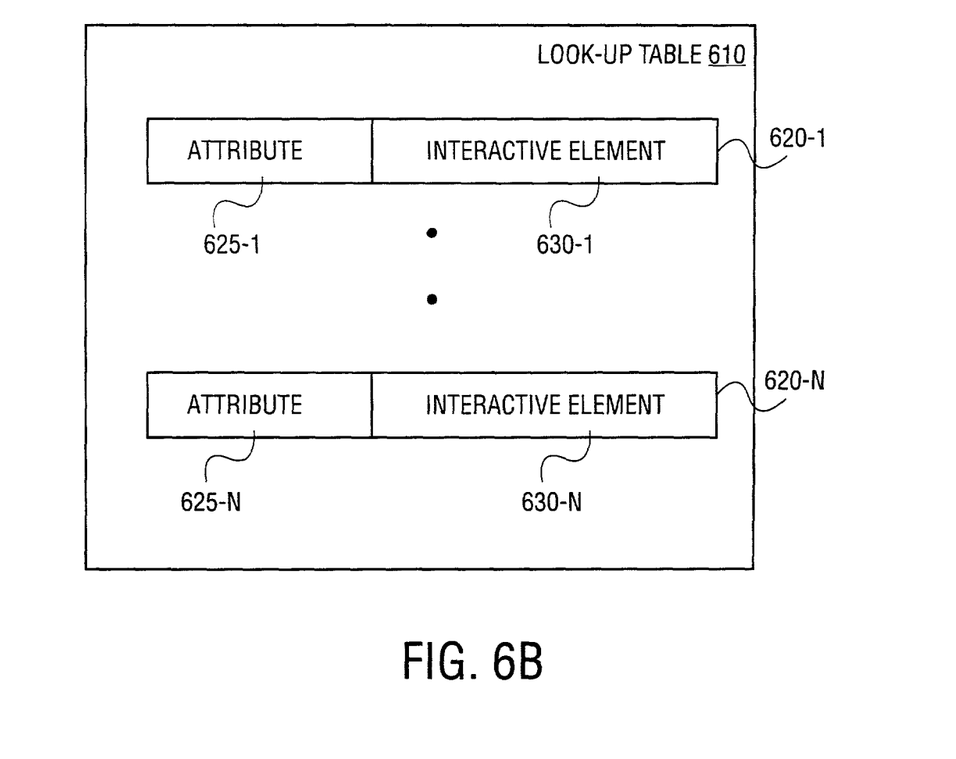
FIG. 6B illustrates a look-up table for determining if a broadcast stream is to be inserted with an interactive element according to one embodiment.

Interactivity engine 402 includes a look-up module 405 having a plurality of entries 620-1 through 620-N such as that shown in FIG. 6B. Interactivity engine 402 will associate the found pattern with one of a plurality of interactive elements 630-1 through 630-N within the entries by matching using the corresponding attributes 625-1 through 625-N. Such attributes can include broadcast information type (e.g. classical, rock, history, art, etc.), names of producers of the program, names of cast members, channel number, names of broadcast advertisers or sponsors, or other types of personalization information. Media asset 602 can thus include information ("pattern") having the same type of information or data.

In one embodiment, interactivity engine 402 will inform insertion engine 401 to insert the matching interactive element with media asset 602 into broadcast data stream 600. Insertion engine 401 can retrieve the interactive element (e.g., interactive TV trigger 112) from repository 304A or directly from interactivity engine 402. Insertion engine 401 can then insert the interactive element into broadcast data stream 600. In one embodiment, the interactive element is an ATVEF trigger. Insertion engine 401 can be used to insert such an interactive element at several points of delivery of a broadcast data stream. For example, insertion engine 401 can be used to insert interactive elements into existing stored media (e.g. for legacy broadcast assets), to insert interactive elements at the head-end prior to delivery, or to insert interactive elements at the client side (e.g., set-top box 106) by using insertion module 107 within set-top box 106 to assist in decoding the interactive element with the broadcast data stream.

Figure 5:
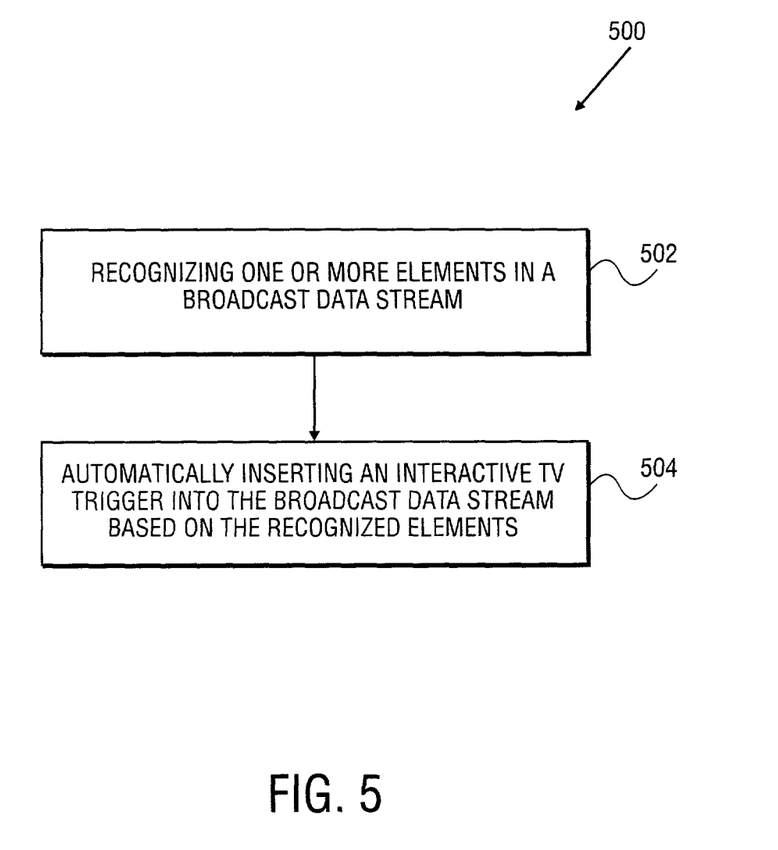
FIG. 5 illustrates a flow diagram of an operation for inserting content into a broadcast data stream according to one embodiment.

FIG. 5 illustrates a flow diagram of an operation 500 for inserting content into a broadcast data stream according to one embodiment. Initially, operation 500 begins at operation 502.

At operation 502, one or more elements in a broadcast data stream are recognized. For example, a media asset 602 within broadcast data stream 600 can be recognized.

At operation 504, an interactive TV trigger is automatically inserted into the broadcast data stream based on the recognized elements. For example, interactive TV trigger 112 can be inserted into broadcast data stream 600 by one of the insertion servers 303A or 303B.

Figure 7:
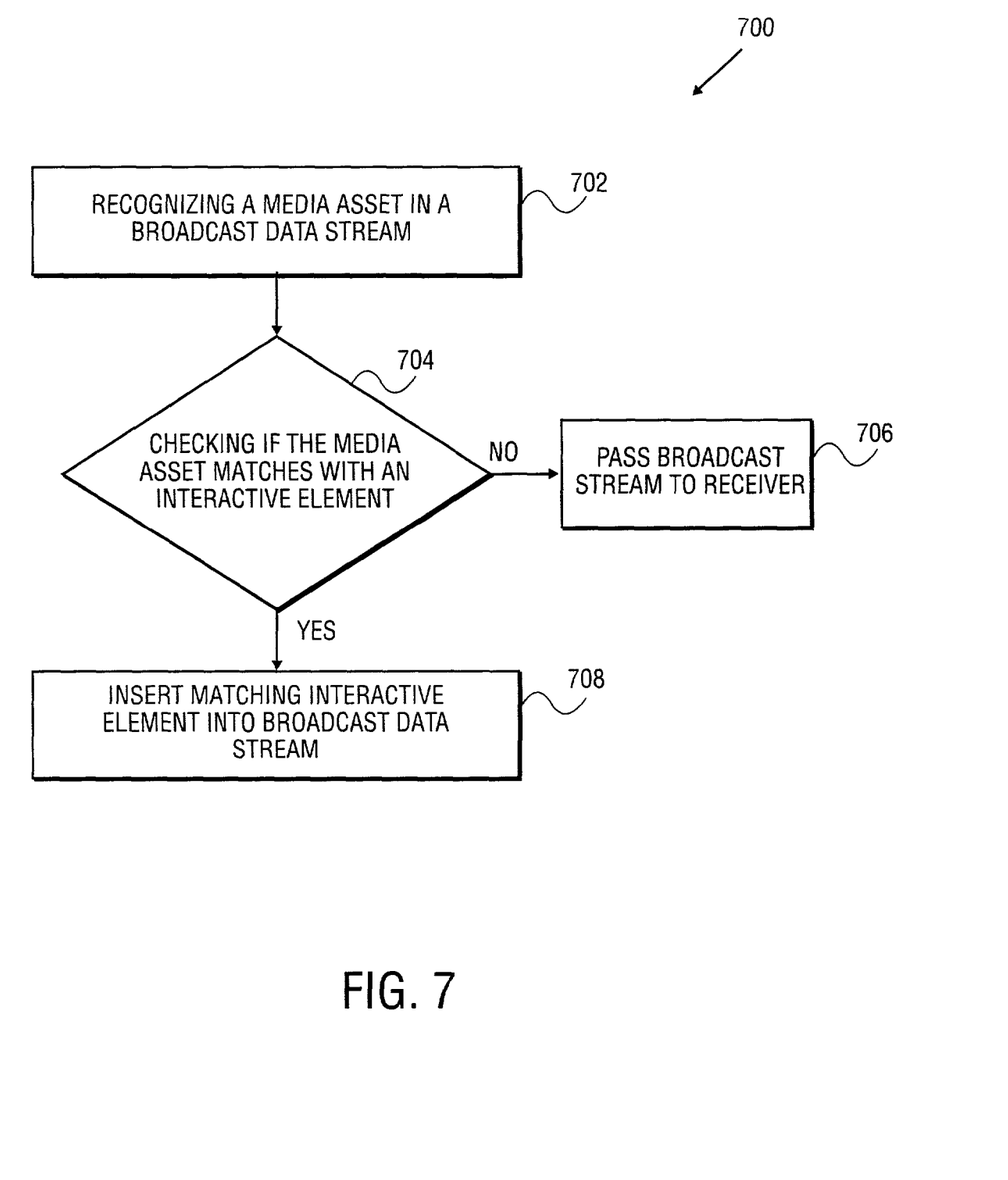
FIG. 7 illustrates a flow diagram of an operation to insert an interactive element into a broadcast data stream by checking a media asset in the broadcast data stream with attributes of the interactive element.

FIG. 7 illustrates a flow diagram of an operation 700 to insert an interactive element into a broadcast data stream by checking a media asset in the broadcast data stream with attributes of the interactive element. Initially, operation 700 begins at operation 702.

At operation 702, a media asset in a broadcast stream is recognized. For example, audio/video pattern recognition filters 411 is instructed to recognize media asset 602 within broadcast data stream 600.

At operation 704, a check is made if the media asset matches with an interactive element. For example, interactivity engine uses look-up table 405 to check if media asset 602 has a matching interactive element within look-up table 405.

At operation 706, if the media asset does not match an interactive element, the broadcast data stream is passed on to a receiver. For example, insertion server 303A or insertion 303B passes broadcast data stream 600 to set-top box 106.

At operation 708, if the media asset does match an interactive element, the matched interactive element is automatically inserted into the broadcast data stream. For example, insertion engine 401 within an insertion server will insert an interactive element ,e.g., interactive TV trigger 112 into broadcast data stream 600.

Thus, a method and system for automatic insertion of interactive TV triggers into a broadcast data stream have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method comprising:
   receiving, by a computing device located at a distribution point within a distribution network, a first transmission comprising a video data stream, wherein the receiving is from a source located remotely from the distribution point, and wherein the first transmission is received by the computing device via the distribution network during delivery of the video data stream to a terminal;
   determining, by the computing device and in response to the receiving, a first pattern in the video data stream received in the first transmission;
   generating, in response to the determining the first pattern, a modified video data stream by inserting, into the video data stream, a first interactive trigger associated with the first pattern;
   transmitting, to the terminal, a second transmission comprising the modified video data stream, wherein the transmitting is by the computing device via the distribution network and is in response to the generating;
   determining, by the terminal, a second pattern in the modified video data stream received in the second transmission; and
   inserting a second interactive trigger associated with the second pattern into the modified video data stream in response to the determining of the second pattern.

2. The method of claim 1, further comprising determining that the first pattern or the second pattern comprises a voice pattern.

3. The method of claim 1, further comprising determining that the first pattern or the second pattern comprises an audio pattern.

4. The method of claim 1, further comprising determining that the first pattern or the second pattern comprises a video pattern.

5. The method of claim 1, further comprising determining that the first pattern or the second pattern comprises a text pattern.

6. The method of claim 1, wherein the first interactive trigger or the second interactive trigger comprises an Advanced Television Enhancement Forum (ATVEF) trigger.

7. The method of claim 1, wherein the first pattern or the second pattern comprises a media pattern.

8. The method of claim 1, further comprising:
determining a third pattern in the video data stream received in the first transmission; and
inserting a third interactive trigger associated with the third pattern into the modified video data stream comprised in the second transmission.

9. The method of claim 1, wherein the receiving, by the computing device, of the first transmission comprises receiving the first transmission from the source located remotely from the computing device via a satellite.

10. The method of claim 1, further comprising performing dynamically the generating of the modified video data stream in the second transmission.

11. A method comprising:
receiving, by a computing device at a distribution point within a distribution network, a first transmission comprising media content, the first transmission being received through the distribution network from a source located remotely from the distribution point;
determining, by the computing device at the distribution point and in response to the receiving, a plurality of audio or video patterns within the media content; and
inserting, automatically in response to the determining, a plurality of interactive triggers associated with the plurality of audio or video patterns into the media content at multiple points along a delivery path of the media content to a terminal, wherein the inserting at one of the multiple points comprises inserting at least one of the plurality of interactive triggers into the media content prior to transmitting the media content to the terminal, and wherein the inserting at another one of the multiple points comprises inserting at least another one of the plurality of interactive triggers into the media content after reception of the media content by the terminal.

12. The method of claim 11, further comprising performing the inserting of the plurality of interactive triggers dynamically with the transmitting of the media content to the terminal.

13. A system comprising:
one or more computer servers located at a distribution point within a distribution network; and
a terminal connected to the distribution network,
wherein the one or more computer servers are configured to:
receive, from a source located remotely from the distribution point, a first transmission comprising a video data stream, wherein the one or more computer servers are configured to receive the first transmission during delivery of the video data stream from the source to the terminal;
determine, in response to the reception of the first transmission, a first pattern in the video data stream received in the first transmission;
generate, in response to the determination of the first pattern, a modified video data stream by inserting a first interactive trigger associated with the first pattern into the video data stream; and
transmit, via the distribution network and in response to the generation of the modified video data stream, a second transmission comprising the modified video data stream; and
wherein the terminal is configured to:
determine a second pattern in the modified video data stream received in the second transmission, and
insert a second interactive trigger associated with the second pattern into the modified video data stream in response to the determination by the terminal of the second pattern.

14. The system of claim 13, wherein the first pattern or the second pattern comprises a voice pattern, an audio pattern, a video pattern, a text pattern, a media pattern, or combinations thereof.

15. The system of claim 13, wherein the first interactive trigger or the second interactive trigger comprises an Advanced Television Enhancement Forum (ATVEF) trigger.

16. The system of claim 13, wherein the one or more computer servers are configured to:
determine a third pattern in the video data stream received in the first transmission; and
insert a third interactive trigger associated with the third pattern into the modified video data stream comprised in the second transmission.

17. The system of claim 13, wherein the one or more computer servers are configured to:
receive, at the distribution point, the first transmission from the source located remotely from the distribution point via a satellite.

18. The system of claim 13, wherein the one or more computer servers are configured to:
perform dynamically the generation of the modified video data stream in the second transmission.

19. A method comprising:
determining, by a computing device at a distribution point within a network, a first pattern in a video stream received from a remote source;
transmitting, by the computing device and responsive to the determining of the first pattern, a modified version of the video stream over the network to a terminal, wherein the modified version of the video stream includes a first interactive trigger inserted into the video stream;
determining, by the terminal, a second pattern in the modified version of the video stream; and
inserting, by the terminal and responsive to the determining of the second pattern, a second interactive trigger into the modified version of the video stream.

20. The method of claim 19, wherein the first pattern comprises at least one of an image pattern, and audio pattern, a voice pattern, and a text pattern.

21. The method of claim 19, wherein the video stream is received from the remote source via a satellite link.

22. The method of claim 19, further comprising inserting, automatically and dynamically, the first interactive trigger into the modified version of the video stream being transmitted.

* * * * *

UNITED STATES PATENT AND TRADEMARK OFFICE
CERTIFICATE OF CORRECTION

PATENT NO. : 9,788,058 B2  Page 1 of 1
APPLICATION NO. : 09/841644
DATED : October 10, 2017
INVENTOR(S) : de Andrade et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1750 days.

Signed and Sealed this
Twenty-fifth Day of September, 2018

Andrei Iancu
*Director of the United States Patent and Trademark Office*